(12) United States Patent
Mujibiya

(10) Patent No.: US 11,604,517 B2
(45) Date of Patent: Mar. 14, 2023

(54) INFORMATION PROCESSING DEVICE, INFORMATION PROCESSING METHOD FOR A GESTURE CONTROL USER INTERFACE

(71) Applicant: RAKUTEN GROUP, INC., Tokyo (JP)

(72) Inventor: Adiyan Mujibiya, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 16/311,663

(22) PCT Filed: Sep. 2, 2016

(86) PCT No.: PCT/JP2016/075894
§ 371 (c)(1),
(2) Date: Dec. 19, 2018

(87) PCT Pub. No.: WO2018/042639
PCT Pub. Date: Mar. 8, 2018

(65) Prior Publication Data
US 2019/0196602 A1    Jun. 27, 2019

(51) Int. Cl.
*G06F 3/01* (2006.01)
*G06F 3/0346* (2013.01)
(Continued)

(52) U.S. Cl.
CPC .............. *G06F 3/017* (2013.01); *G06F 3/012* (2013.01); *G06F 3/013* (2013.01); *G06F 3/038* (2013.01);
(Continued)

(58) Field of Classification Search
None
See application file for complete search history.

(56) References Cited

U.S. PATENT DOCUMENTS

| 8,933,882 B2 * | 1/2015 | Burachas | G06F 3/012 345/157 |
| 2002/0097218 A1 * | 7/2002 | Gutta | G06F 3/0304 345/156 |

(Continued)

FOREIGN PATENT DOCUMENTS

| JP | 2000-222098 A | 8/2000 |
| JP | 2000222098 A * | 8/2000 |

(Continued)

OTHER PUBLICATIONS

English translation of the International Search Report for PCT/JP2016/075894 dated Nov. 1, 2016.

*Primary Examiner* — Daniel Samwel
*Assistant Examiner* — Samuel Shen
(74) *Attorney, Agent, or Firm* — Hea Law PLLC

(57) ABSTRACT

An information processing device obtains an indicated position that is actually indicated by an object which is directed toward a screen and located on a plane including the screen. The information processing device obtains a relative position of a user to the actual indicated position. The information processing device obtains an input position on the screen, which corresponds to a current position of the object, and enables suppression of a movement amount of the input position with respect to an operation amount based on the relative position when the user has moved the object. The information processing device executes predetermined processing based on the input position.

20 Claims, 11 Drawing Sheets

(51) Int. Cl.
*G06F 3/0481* (2022.01)
*G06F 3/038* (2013.01)
*G06F 3/0487* (2013.01)

(52) U.S. Cl.
CPC .......... *G06F 3/0346* (2013.01); *G06F 3/0481* (2013.01); *G06F 3/0487* (2013.01)

(56) References Cited

U.S. PATENT DOCUMENTS

| | | | |
|---|---|---|---|
| 2008/0106517 A1* | 5/2008 | Kerr | G09G 5/373 345/158 |
| 2012/0157208 A1* | 6/2012 | Reville | G06F 3/04817 463/39 |
| 2013/0222246 A1* | 8/2013 | Booms | G06F 3/0484 345/168 |
| 2015/0258431 A1* | 9/2015 | Stafford | A63F 13/211 463/31 |
| 2016/0026264 A1* | 1/2016 | Cheng | G06F 3/03542 345/156 |
| 2016/0048223 A1* | 2/2016 | Taguchi | G06F 3/0487 345/157 |
| 2016/0140762 A1* | 5/2016 | Niinuma | G06K 9/00201 345/633 |
| 2016/0239096 A1* | 8/2016 | Okuno | H04N 21/42222 |
| 2016/0334884 A1* | 11/2016 | Solomon | G06F 3/0386 |

FOREIGN PATENT DOCUMENTS

| | | |
|---|---|---|
| JP | 2004-522220 A | 7/2004 |
| JP | 2015-176451 A | 10/2015 |
| JP | 2015176451 A * | 10/2015 |

* cited by examiner

INFORMATION PROCESSING DEVICE, INFORMATION PROCESSING METHOD FOR A GESTURE CONTROL USER INTERFACE

CROSS REFERENCE TO RELATED APPLICATIONS

This application is a National Stage of International Application No. PCT/JP2016/075894 tiled on Sep. 2, 2016. The contents of the above document is incorporated herein by reference in its entirety.

TECHNICAL FIELD

The present invention relates to an image processing device, an image processing method, and a program.

BACKGROUND ART

There are known techniques relating to a user interface in which a user directs an object, such as a hand and a controller, toward a screen, thereby entering an input position on the screen. For example, Patent Literature 1 describes the device for detecting positions of the user's body and hand, and when the user holds his hand over the screen, setting the intersection point of the line from the body to the hand and the screen as the input position.

CITATION LIST

Patent Literature

Patent Literature 1: JP2004-522220A

SUMMARY OF INVENTION

Technical Problem

However, in Patent Literature 1, the movement amount of the input position relative to the operation amount of the user (movement amount of the hand) is determined by the relative position of the user to the input position, and thus feel of operation of the user is greatly affected by the relative position. For example, if the user stands on the left when viewed from the front of the screen and holds his hand over the front of the screen, the movement amount of the input position relative to the operation amount is small due to the angular relationship of the input position and the user. As such, fine adjustment of the input position is possible. On the other hand, when the user holds his hand diagonally forward to the right and then moves the hand further to the right, the movement amount of the input position relative to the operation amount is large due to the angular relationship of the input position and the user. As such, fine adjustment of the input position is difficult. As such, in Patent Literature 1, fine adjustment of the input position is difficult depending on the relative position of the user to the input position, and thus user operability cannot be fully improved.

One or more embodiments of the present invention have been conceived in view of the above, and an object thereof is to improve operability of a user interface in which a user directs an object toward a screen, thereby entering an input position on the screen.

Solution to Problem

In order to solve the above described problems, an information processing device according to the present invention includes actual indicated position obtaining means for obtaining an actual indicated position that is actually indicated by an object which is directed toward a screen and located on a plane including the screen, relative position obtaining means for obtaining a relative position of a user to the actual indicated position, input position obtaining means for obtaining an input position on the screen, the input position corresponding to a current position of the object, and for enabling suppression of a movement amount of the input position with respect to an operation amount based on the relative position when the user has moved the object, and processing execution means for executing predetermined processing based on the input position obtained by the input position obtaining means.

An information processing method according to the present invention includes an actual indicated position obtaining step of obtaining an actual indicated position that is actually indicated by an object which is directed toward a screen and located on a plane including the screen, a relative position obtaining step of obtaining a relative position of a user to the actual indicated position, an input position obtaining step of obtaining an input position on the screen, the input position corresponding to a current position of the object, and for enabling suppression of a movement amount of the input position with respect to an operation amount based on the relative position when the user has moved the object, and a processing execution step of executing predetermined processing based on the input position obtained in the input position obtaining step.

A program according to the present invention that causes a computer to function as actual indicated position obtaining means for obtaining an actual indicated position that is actually indicated by an object which is directed toward a screen and located on a plane including the screen, relative position obtaining means for obtaining a relative position of a user to the actual indicated position, input position obtaining means for obtaining an input position on the screen, the input position corresponding to a current position of the object, and for enabling suppression of a movement amount of the input position with respect to an operation amount based on the relative position when the user has moved the object, and processing execution means for executing predetermined processing based on the input position obtained by the input position obtaining means.

An information storage medium according to the present invention is a computer-readable information storage medium that stores the program.

In one aspect of the present invention, when the object transitions to an indicating state, in which the object points to the screen, from a non-indicating state, in which the object does not point to the screen, the input position obtaining means obtains the current actual indicated position as the input position, and when the user moves the object after the object transitions to the indicating state, the input position obtaining means can suppress a movement amount of the input position.

In one aspect of the present invention, the input position obtaining means obtains, as a reference position, the actual indicated position when the object transitions to the indicating state from the non-indicating state, and when the user moves the object after the object transitions to the indicating state, the input position obtaining means can suppress a movement amount of the input position from the reference position based on the relative position.

In one aspect of the present invention, the information processing device further includes three-dimensional coordinate obtaining means for obtaining three-dimensional coordinates indicating a position of the object and three-dimensional coordinates indicating a position of the user. The actual indicated position obtaining means obtains the actual indicated position based on the three-dimensional coordinates of the object. The relative position obtaining means obtains the relative position based on the three-dimensional coordinates of the user. The input position obtaining means obtains the input position based on the three-dimensional coordinates of the object.

In one aspect of the present invention, the actual indicated position is a position on the screen and determined by a direction from a position of a head of the user to a position of the object, and the relative position is a position of the head of the user relative to the actual indicated position.

In one aspect of the present invention, when the user moves the object, the input position obtaining means obtains the input position based on a change in a relative position of the object to the user.

In one aspect of the present invention, when the user moves the object, the input position obtaining means obtains the input position based on an angle of a motion of the object to the user.

In one aspect of the present invention, the information processing device further includes motion determining means for determining whether the user has moved. If it is determined that the user has moved, the relative position obtaining means reobtains the relative position, and the input position obtaining means reobtains the input position based on the reobtained relative position.

In one aspect of the present invention, when the user moves the object after the object transitions to the indicating state, the input position obtaining means obtains the input position such that a movement amount of the current input position from the reference position is smaller than a movement amount of the current actual indicated position from the reference position.

In one aspect of the present invention, when the object transitions to the indicating state and then transitions to the non-indicating state again, the position obtaining means terminates processing for obtaining the input position, and when the object transitions to the non-indicating state again and then transitions to the indicating state again, the position obtaining means reobtains the current actual indicated position as a new input position and a new reference position.

In one aspect of the present invention, when the object transitions to the indicating state from the non-indicating state and a position of the object is maintained in the indicating state for a predetermined period of time or more, the input position obtaining means reobtains the current actual indicated position as the input position and the reference position.

In one aspect of the present invention, the predetermined processing is image processing for making the input position identifiable on the screen.

In one aspect of the present invention, when the object transitions to the indicating state and then a predetermined condition is satisfied, the input position obtaining means reobtains the current actual indicated position as a new input position and a new reference position. The information processing device further includes gaze determining means for determining whether the user gazes at the input position. If it is determined that the user gazes at the input position, even though the predetermined condition is satisfied, the input position obtaining means does not execute the processing for setting the current actual indicated position to an input position and a reference position. If it is determined that the user does not gaze at the input position and the predetermined condition is satisfied, the input position obtaining means executes the processing for setting the current actual indicated position to an input position and a reference position.

In one aspect of the present invention, when the user moves the object, the input position obtaining means obtains the input position based on a velocity of the object.

In one aspect of the present invention, when the object transitions to the indicating state and the predetermined condition, the input position means obtains the current actual indicated position as the input position and the reference position. When the user moves the object while the object is maintained in the predetermined condition, the input position obtaining means obtains the input position based on the reference position. The input position obtaining means terminates the processing for obtaining the input position when the predetermined condition of the object is released.

In one aspect of the present invention, the object is a hand of the user. The actual indicated position is a position on the screen and determined based on a direction from a position of a reference portion of the user to a position of the hand. The relative position is a position of the reference portion relative to the actual indicated position.

Effects of the Invention

According to the present invention, it is possible to improve operability of a user interface in which a user directs an object toward a screen, thereby entering an input position on the screen.

DESCRIPTION OF EMBODIMENTS

[1. Hardware Configuration of Information Processing System]

Figure 1:
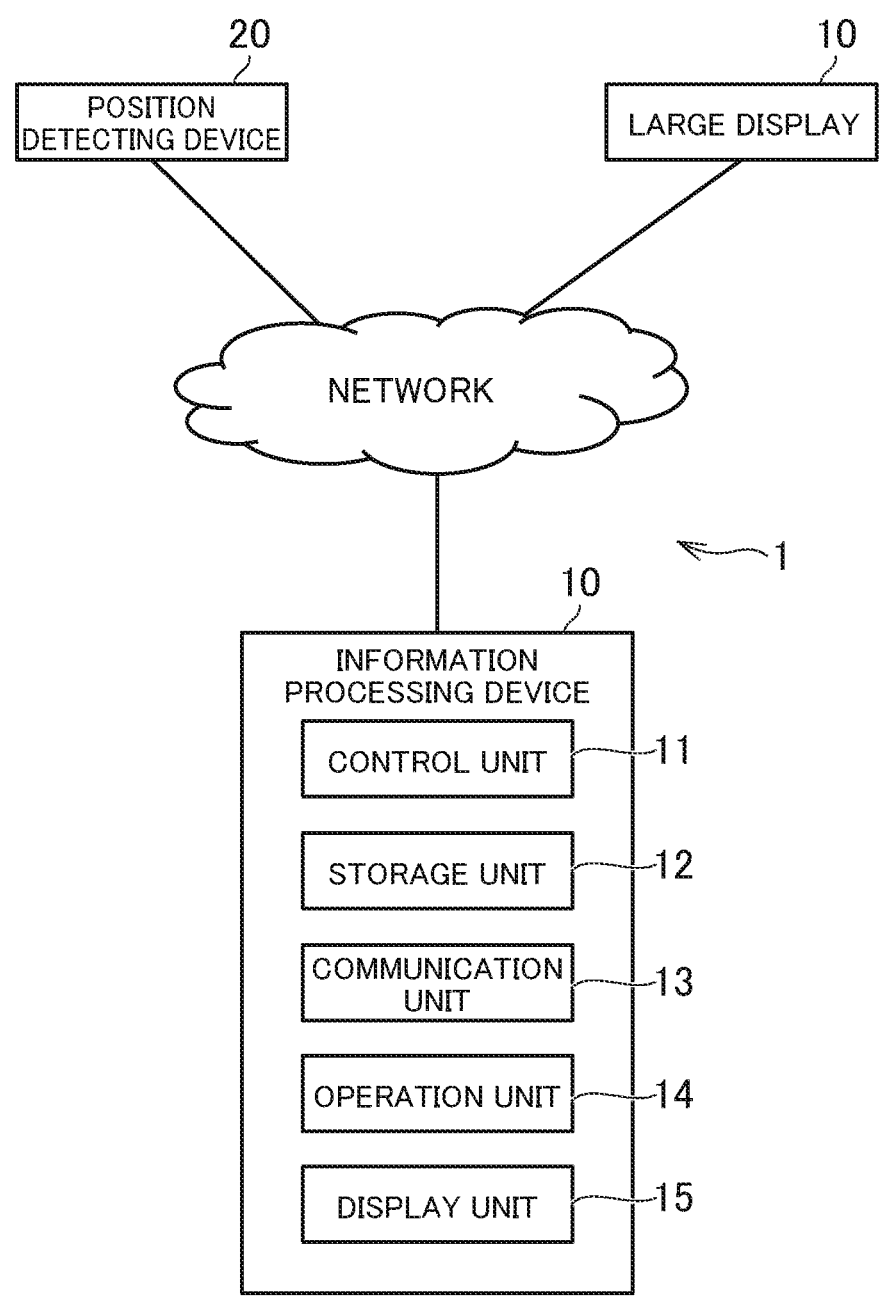
FIG. 1 is a diagram illustrating an overall configuration of an information processing system.
Figure 11:
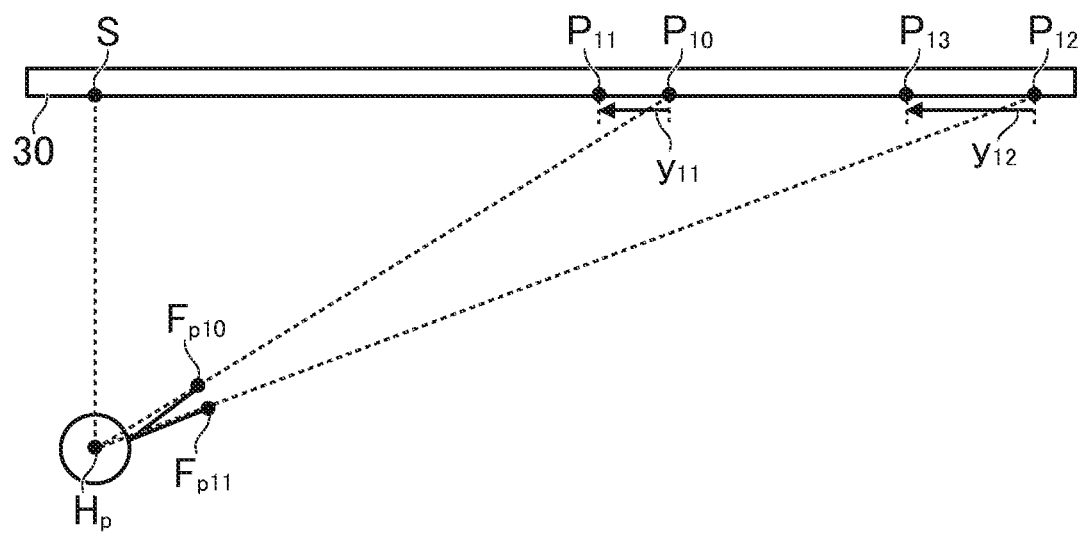
FIG. 11 is a diagram illustrating a method for obtaining an input position in variation (4).

An embodiment of an information processing system including an information processing device according to the present invention will be described. FIG. 1 is a diagram illustrating an overall configuration of the information processing system. As shown in FIG. 11, the information processing system 1 includes an information processing device 10, a position detecting device 20, and a large display 30. The information processing device 10, the position detecting device 20, and the large display 30 may be communicatively coupled to one another by wire or wireless via a network.

The information processing device 10 is a computer capable of information processing, such as a personal computer, a server computer, a portable information terminal (including a tablet computer), and a mobile phone (including a smartphone). As shown in FIG. 1, the information processing device 10 includes a control unit 11, a storage unit 12, a communication unit 13, an operation unit 14, and a display unit 15.

The control unit 11 includes, for example, at least one microprocessor. The control unit 11 executes processing in accordance with programs and data stored in the storage unit 12. The storage unit 12 includes a main storage unit and an auxiliary storage unit. For example, the main storage unit is a volatile memory such as a RAM, and the auxiliary storage unit is a nonvolatile memory such as a hard disk and a flash memory. The communication unit 13 includes a wired or wireless communication interface for data communications through a network, for example. The operation unit 14 is an input device for a player to operate, including a pointing device, such as a touch panel and a mouse, and a keyboard. The operation unit 14 transmits an operation of a player to the control unit 11. The display unit 15 is, for example, a liquid crystal display unit and an organic EL display unit. The display unit 15 displays a screen based on instructions from the control unit 11.

The programs and data described as being stored in the storage unit 12 may be provided to these units through a network. The hardware configuration of the information processing device 10 is not limited to the above examples, and hardware of various types of computers can be applied. For example, the information processing device 10 may include a reader (e.g., optical disc drive and memory card slot) for reading a computer-readable information storage medium, and an input/output unit (e.g., USB port and video input/output terminal) for directly connecting to external devices. In this case, programs and data stored in the information storage medium may be provided to the information processing device 10 through the reader or the input/output unit.

The position detecting device 20 is a device for detecting a position of an object arranged in the space. In this embodiment, a case will be described in which the position detecting device 20 detects a three-dimensional position, although the position detecting device 20 may only detect a two-dimensional position. For example, the position detecting device 20 detects a position of an object to be used for inputting an input position. The input position can be described as a position that is input on a screen of the information processing device 10 (i.e., a position specified by a user), and a position on the screen recognized by the information processing device 10. The input position is the same as a position that is input by a general pointing device.

The object may be an object detectable by the position detecting device 20 at its position, and changeable by a user in at least either of position or orientation. In other words, the object may be held by a user and directed toward the screen, and point to the screen. The object may be a user himself, or an indicating member other than the user. If the object is a user himself, a predetermined portion of the user corresponds to an object, such as a hand, finger, wrist, arm, or leg. The portion of the user means a portion of a human body, and includes not only limbs, a torso, and a head, but also joints and bones inside the body. If the object is an indicating member other than the user, a member held by the user may correspond to the object, or a member fixed to any one of limbs of the user, such as a stick, pen, or input device, may correspond to the object. The input device may be a general pointing device, and include a gyro sensor or an accelerometer capable of detecting a displacement or a posture change of the input device.

In this embodiment, a case will be described in which the user's hand corresponds to an object. As such, the user can use his own hand to enter an input position, and move the input position by moving the hand. The position detecting device 20 may be capable of detecting a position of a portion other than the hand, which is an object. For example, the position detecting device 20 may include a position detecting sensor capable of detecting positions of multiple portions of the user, and generating three-dimensional coordinates of the positions of the respective portions. The position detecting sensor may be an image pickup element such as a CCD image sensor and a CMOS image sensor, a depth sensor such as an infrared sensor, or a RGBD camera combining these functions. For example, the position detecting sensor may be a Kinect (Trademark) sensor capable of detecting three-dimensional coordinates of the bone structure of the user.

The method of detecting three-dimensional coordinates of a subject may use various known methods, such as a light coding method using distortion in an infrared light pattern, or a traveling time method using traveling time of infrared light. Here, the subject is a user (i.e., human), and thus the position detecting device 20 obtain three-dimensional coordinates of the portions of the user based on a depth image indicating positions on the surface of the user and their depths in a horizontal direction. The portions from which the position detecting device 20 detects the three-dimensional coordinates may be any portions, such as a head and a hand, that are extractable by a known skeleton extraction method.

The position detecting device 20 includes a communication interface for wired or wireless communications, and can output portion information indicating three-dimensional coordinates of portions of the user to the information processing device 10. For example, the position detecting device 20 generates portion information at a predetermined frame rate (e.g., 30 fps). In other words, the information processing device 10 can obtain the latest portion information generated by the position detecting device 20 at regular time intervals (e.g., 1/30 second). The position detecting device 20 may generate portion information at irregular intervals in response to a request from the information processing device 10 without setting a frame rate.

The large display 30 is at least one liquid crystal display device or organic EL display device. The large display 30 may have any screen size and aspect ratio, and here, is described as being several to several tens of meters in width. The large display 30 may only include a single display device, or multiple display devices arranged for a multi-display system. The large display 30 includes a communication interface for wired or wireless communications, and can display an image received from the information processing device 10 or other computers. For example, the large display 30 may be capable of displaying the same image as the image displayed on the display unit 15 of the information processing device 10.

[2. Overview of Processing Executed by the Information Processing Device]

Figure 2:
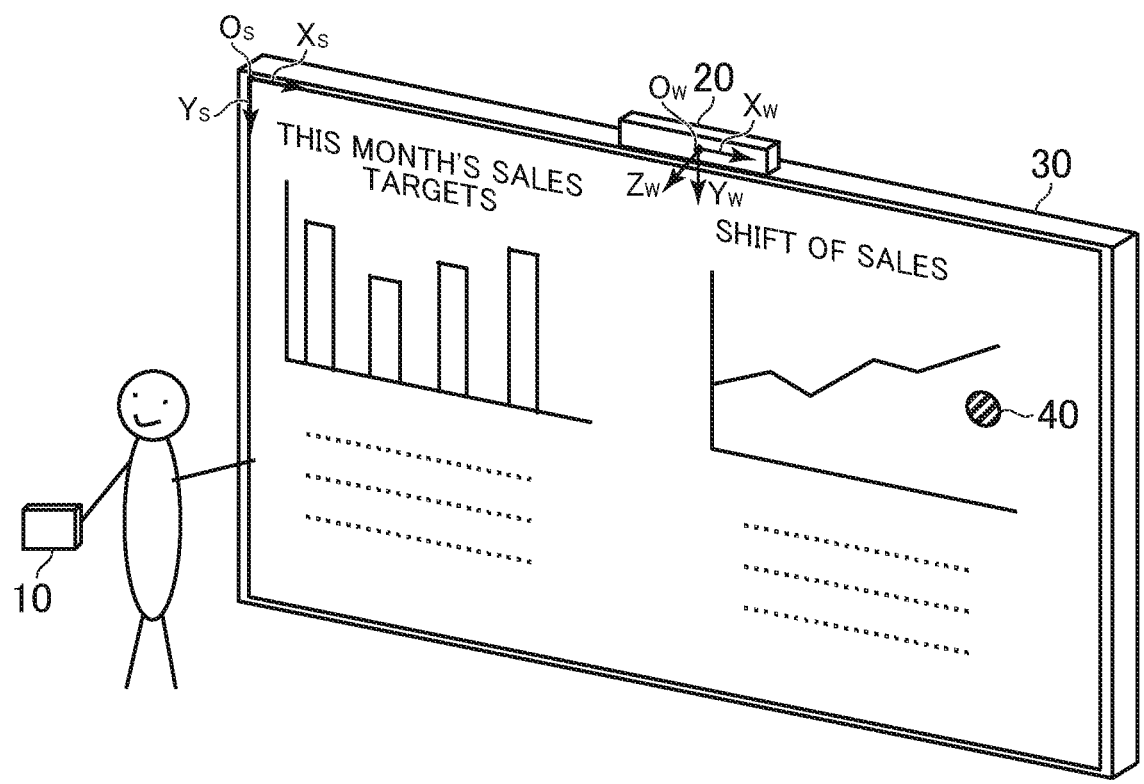
FIG. 2 is a diagram illustrating the information processing system 1 being used.

Next, overview of the processing executed by the information processing device 10 will be described. FIG. 2 is a diagram illustrating the information processing system 1 being used. As shown in FIG. 2, for example, the position detecting device 20 is disposed around the center of the upper side of the large display 30, and the user operates the information processing device 10 to display materials on the large display 30 for a presentation. In this embodiment, $X_w$ axis-$Y_w$ axis-$Z_w$ axis, which are coordinate axes of the world coordinate system (or view coordinate system) with the origin $O_w$ at the position detecting device 20, and $X_s$ axis-$Y_s$ axis, which are coordinate axes of the screen coordinate system with the origin $O_s$ at the top-left corner of the screen of the large display 30, are defined. The position detecting device 20 and the large display 30 are calibrated in advance, and can recognize the relationship between the user and the screen at the field angles of the position detecting device 20.

The information processing device 10 refers to the portion information obtained from the position detecting device 20, and displays a pointer 40 on the screen when detecting that the user's hand is directed toward the screen. The user can use the pointer 40 to indicate the portion of the materials that the user is explaining. As described above, if the pointer 40 is displayed with the intersection point of the screen and the line from the body of the user to the hand as an input position, fine adjustment of the display position of the pointer 40 can be difficult depending on the relative position of the user to the input position due to their angles. This reduces the operability.

Figure 3:
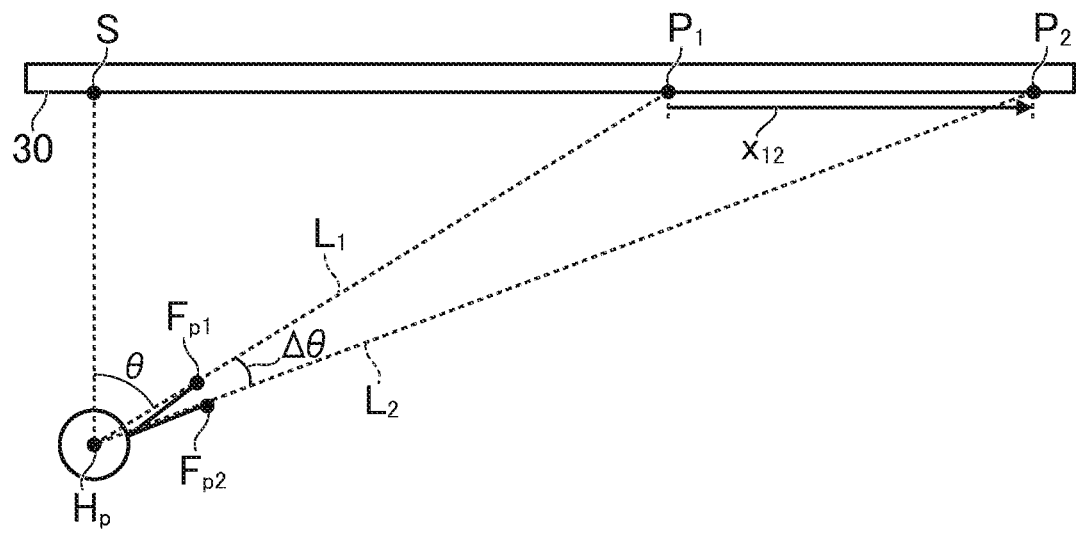
FIG. 3 is a diagram for explaining an example of problems of conventional techniques in detail.
Figure 4:
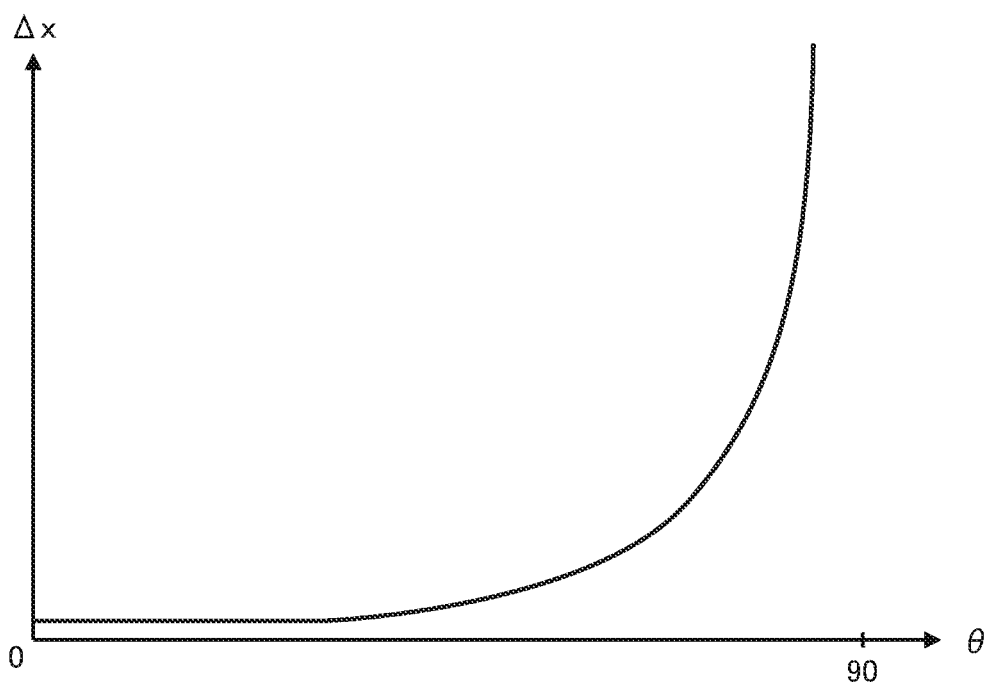
FIG. 4 is a diagram for explaining an example of problems of conventional techniques in detail.

FIGS. 3 and 4 are diagrams for explaining an example of the problems of conventional techniques in detail. FIG. 3 illustrates a space with a user as viewed from the above. Here, a position of the body as a reference to determine an input position is the head of the user. As shown in FIG. 3, when the position of the user's hand is $F_{p1}$ and the position of the user's head is $H_p$, in the conventional techniques, an input position $P_1$ is an intersection point of a line $L_1$ extending from the head $H_p$ to the hand $F_{p1}$ and the screen of the large display 30. When the position of the hand of the user after the user moves the hand to the right by an angle $\Delta\theta$ is $F_{p2}$, an input position $P_2$ at this time is an intersection point of a line $L_2$ extending from the head $H_p$ to the hand $F_{p2}$ and the screen of the large display 30. In this case, a movement amount of the input position (i.e., distance between the input positions $P_1$ and $P_2$) is indicated by $x_{12}$ in FIG. 3.

In this embodiment, an angle of $\theta$ indicates the relative position of the user to the input position $P_1$. When the position of the foot of a perpendicular from the head $H_p$ to the screen is S, the relative position $\theta$ is $\angle SH_pP_1$ ($=\angle SH_pF_{p1}$). When a distance between the head $H_p$ and the foot of the perpendicular S is a, and a distance between the foot of the perpendicular S to the input position $P_1$ is b, the relationship of the movement amount $x_{12}$, the relative position $\theta$, and $\Delta\theta$, which is an operation amount of the user, is represented by the following equations.

$$\frac{b}{a} = \tan\theta \tag{1}$$

$$\frac{b + x_{12}}{a} = \tan(\theta + \Delta\theta) \tag{2}$$

$$\tan\theta + \frac{x_{12}}{a} = \tan(\theta + \Delta\theta) \tag{3}$$

$$\frac{x_{12}}{a} = \tan(\theta + \Delta\theta) - \tan\theta \tag{4}$$

$$x_{12} = \{\tan(\theta + \Delta\theta) - \tan\theta\} \cdot a \tag{5}$$

For example, when the movement amount of the input position is $\Delta x$ (hereinafter, referred to as unit movement amount) when the operation amount $\Delta\theta$ is 1° (hereinafter, referred to as unit operation amount), by the above described equation 5, the relationship between the relative position $\theta$ and the unit movement amount $\Delta x$ is represented as shown in FIG. 4. As shown in FIG. 4, in the conventional techniques, when the angle $\theta$ is larger, the unit movement amount $\Delta x$ is dramatically larger. As such, fine adjustment of the input position is difficult. In view of this, the information processing device 10 in this embodiment suppresses the unit movement amount $\Delta x$ when the angle $\theta$ becomes large.

Figure 5:
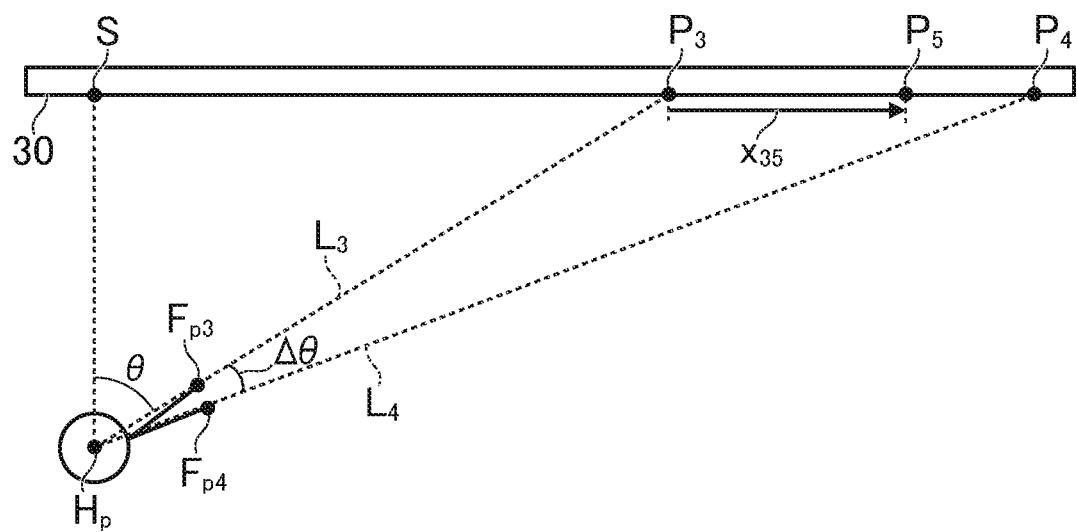
FIG. 5 is a diagram for explaining overview of processing executed by the information processing device.
Figure 6:
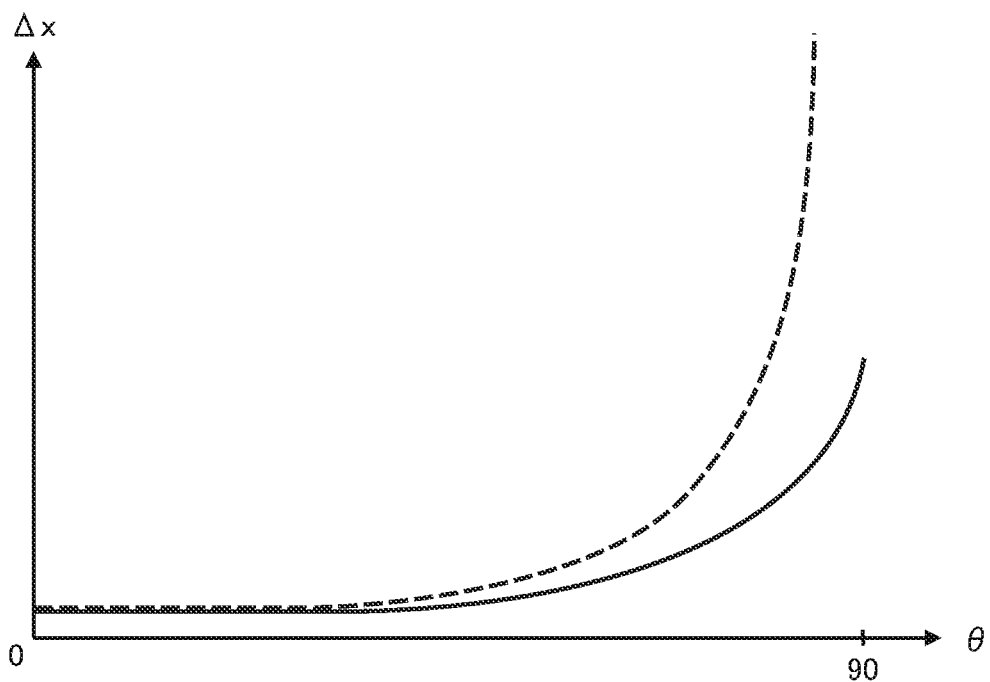
FIG. 6 is a diagram for explaining overview of processing executed by the information processing device.

FIGS. 5 and 6 are diagrams for explaining overview of the processing executed by the information processing device 10. Similarly to FIG. 3, FIG. 5 illustrates a space with a user as viewed from the above. As shown in FIG. 5, just after the user holds his hand on the screen, as is conventional, the intersection point of the line $L_3$ from the head $H_p$ to the hand $F_{p3}$ and the screen of the large display 30 may be the input position $P_3$. When the user moves his hand thereafter, the input position is different from the conventional techniques. For example, when the position of the hand after the user moves his hand in the right direction by the angle $\Delta\theta$ is $F_{p4}$, the input position $P_5$ is closer to the user than the position $P_4$ of the intersection point of the line $L_4$ from the head $H_p$ to the hand $F_{p4}$ and the screen of the large display 30. In this case, a movement amount $x_{35}$ of the input position (i.e., distance between the input positions $P_3$ and $P_5$) is controlled to be smaller than the movement amount $x_{12}$ in the conventional techniques.

In this embodiment, in order to suppress the movement amount of the input position, the relationship between the angle $\theta$ and the unit movement amount $\Delta x$ is defined as indicated in the solid line in FIG. 6. This relationship may be defined by, for example, setting $\theta$ in the equation 5 to "$n \times \theta$" (n is any number greater than 1, such as about 1.1 to 2.0). In FIG. 6, for comparison, the relationship in the conventional techniques (i.e., solid line in FIG. 4) is indicated in a dashed line. As shown in FIG. 6, in this embodiment, the operability is improved by reducing the unit movement amount $\Delta x$ when the angle of the relative position $\theta$ is large, and enabling fine adjustment of the input position even if the angle $\theta$ becomes large. This technique will be described in details below.

[3. Processing Executed in this Embodiment]

Figure 7:
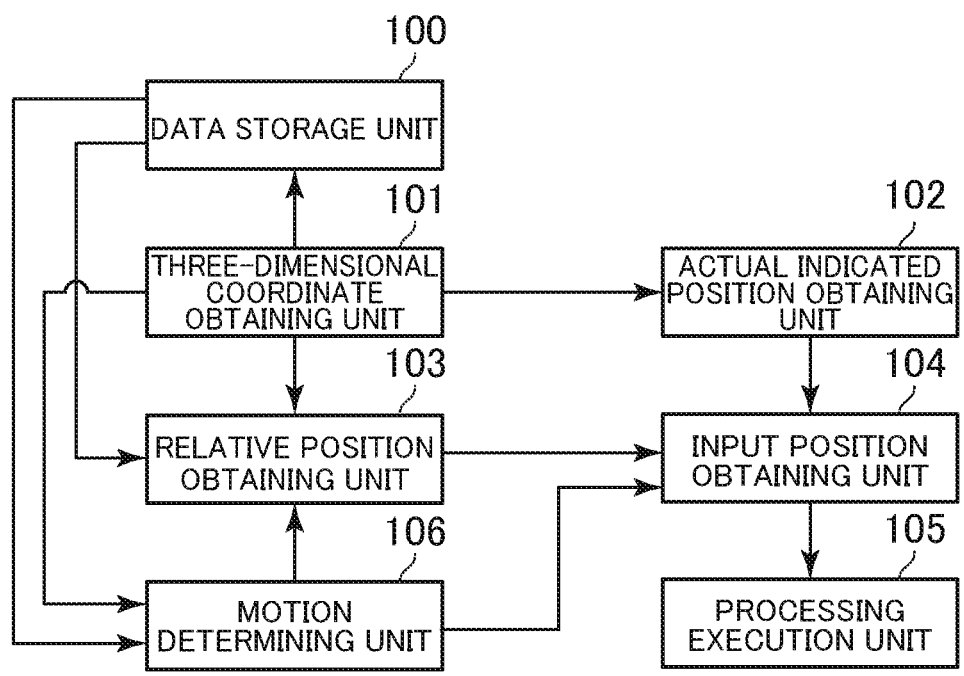
FIG. 7 is a functional block diagram showing an example of functions implemented in the information processing device.

FIG. 7 is a functional block diagram showing an example of functions implemented in the information processing system 1. As shown in FIG. 7, in this embodiment, the information processing device 10 implements a data storage unit 100, a three-dimensional coordinate obtaining unit 101, an actual indicated position obtaining unit 102, a relative position obtaining unit 103, an input position obtaining unit 104, a processing execution unit 105, and a motion determining unit 106. In the following, if the drawings need not be referred to, reference of signs of the head $H_p$ and the relative position $\theta$, for example, are omitted.

[3-1. Data Storage Unit]

The data storage unit 100 is implemented mainly by the storage unit 12. The data storage unit 100 stores data necessary for suppressing a movement amount of an input position. Here, as an example of such data, relational data indicating the relationship between a relative position θ and a unit movement amount Δx (FIG. 6) will be described. The relational data may be provided in a numerical formula (e.g., equation 5) or a table format, or described in a portion of a program code. If the relational data is a portion of a program code, the relational data may be a function that, when a relative position θ is input as an argument, returns the corresponding unit movement amount Δx as a return value.

The data stored in the data storage unit 100 is not limited to the above example. For example, the data storage unit 100 may store history of the portion information generated by the position detecting device 20. For example, the data storage unit 100 may store coordinate data in which a position of the screen of the large display 30 in the world coordinate system (e.g., coordinates at four corners of the screen) is defined. For example, the data storage unit 100 may store image data of the pointer 40.

[3-2. Three-Dimensional Coordinate Obtaining Unit]

The three-dimensional coordinate obtaining unit 101 is implemented mainly by the control unit 11. The three-dimensional coordinate obtaining unit 101 obtains portion information indicating three-dimensional coordinates of the portions of the user from the position detecting device 20. The portion information includes the three-dimensional coordinates indicating the position of the user's hand, and thus the three-dimensional coordinate obtaining unit 101 obtains the three-dimensional coordinates indicating the position of the user's hand.

The portion information includes three-dimensional coordinates of not only the user's hand but also the user's position, and thus the three-dimensional coordinate obtaining unit 101 also obtains the three-dimensional coordinates indicating the user's position. Here, the user's position is a portion other than hands, and referred to in order to determine the relative position or the input position. In this embodiment, such portion is described as a reference portion. When the user's hand corresponds to an object as in this embodiment, a direction indicated by the user cannot be specified only by the position of the hand, and thus the reference portion is used to specify such a direction.

The reference portion may be any portion other than hands, such as head, neck, chest, backbone, waist, and other portions that are not in conjunction with hands. In this embodiment, a case will be described in which the user's head is a reference portion. As such, the three-dimensional coordinate obtaining unit 101 obtains the three-dimensional coordinates indicating the position of the user's hand and the three-dimensional coordinates of the position of the user's head.

[3-3. Actual Indicated Position Obtaining Unit]

The actual indicated position obtaining unit 102 is implemented mainly by the control unit 11. The actual indicated position obtaining unit 102 obtains an actual indicated position, which is a position actually indicated by the user's hand directed to the screen and located on a plane including the screen. The actual indicated position is a position on the screen physically indicated by the user in the space. For example, the actual indicated position is an intersection point of a line extending in the direction indicated by the user from the position of the user's hand and the screen. The actual indicated position may be represented by three-dimensional coordinates in the world coordinate system, or two-dimensional coordinates in the screen coordinate system. In this embodiment, the actual indicated position is represented by three-dimensional coordinates. The actual indicated position is not necessarily on the screen, but may be on a plane including the screen. The plane including the screen may be matched with the screen, or may be a plane including the screen and its surrounding. In other words, the actual indicated position may be inside or outside the screen. For example, if the user indicates a position outside the screen, the actual indicated position obtaining unit 102 may be able to obtain an actual indicated position outside the screen.

The actual indicated position obtaining unit 102 obtains an actual indicated position based on a position of the user's hand. In this embodiment, three-dimensional coordinates of a hand can be obtained, and thus the actual indicated position obtaining unit 102 obtains an actual indicated position based on the three-dimensional coordinates of the user's hand. The user's head corresponds to the reference portion, and thus the actual indicated position obtaining unit 102 obtains an actual indicated position based on the three-dimensional coordinates of the user's hand and the three-dimensional coordinates of the position of the user's head. As such, for example, the actual indicated position may be a position on the screen determined by a direction from the position of the user's head to the position of the hand. In this embodiment, the intersection point shown in FIG. 5 of the line L from the user's head $H_p$ to the user's hand $F_P$ and the screen is set to an actual indicated position as it is, although a point within a predetermined distance from the intersection point may be set to an actual indicated position. In other words, an actual indicated position may not necessarily be matched with the intersection point.

[3-4. Relative Position Obtaining Unit]

The relative position obtaining unit 103 is implemented mainly by the control unit 11. The relative position obtaining unit 103 obtains a relative position of the user to an actual indicated position. The relative position indicates a positional relationship between an actual indicated position and the user, and from where the user points to the screen. In other words, the relative position indicates how the perpendicular on the screen from the actual indicated position deviates from the user, and also can be described as a position of the user relative to the screen. The relative position may be represented by information capable of identifying the position of the user viewed from the actual indicated position, such as a vector or a coordinate value. Here, an angle (e.g., θ in FIG. 5) is used to indicate a relative position. The relative position obtaining unit 103 may obtain a relative position of any portion of the user to the actual indicated position, and here, obtains a relative position of the user's head to the actual indicated position.

For example, the relative position obtaining unit 103 obtains a relative position based on the user's three-dimensional coordinates. In this embodiment, the user's head is the reference portion, and thus the relative position obtaining unit 103 obtains a relative position based on the three-dimensional coordinates of the user's head. For example, the relative position obtaining unit 103 obtains, from the three-dimensional coordinates of the user's head obtained by the three-dimensional coordinate obtaining unit 101, three-dimensional coordinates of the foot of the perpendicular S (FIG. 5) to the screen (here, $X_w$-$Y_w$ plane) of the large display 30. The relative position obtaining unit 103 obtains, as a relative position, an angle θ generated by the three-dimensional coordinates of the foot of the perpendicular S, the three-dimensional coordinates of the user's head $H_p$, and the three-dimensional coordinates of the actual indicated position or the hand $F_p$.

[3-5. Input Position Obtaining Unit]

The input position obtaining unit 104 is implemented mainly by the control unit 11. The input position obtaining unit 104 obtains an input position on the screen corresponding to the current position of the user's hand. The input position obtaining unit 104 obtains an input position based on the current position of the user's hand, and moves the input position when the user's hand has moved.

In this embodiment, three-dimensional coordinates of a hand can be obtained, and thus the input position obtaining unit 104 obtains an input position based on the three-dimensional coordinates of the user's hand. The input position may be represented by three-dimensional coordinates in the world coordinate system, or two-dimensional coordinates in the screen coordinate system. In this embodiment, the input position is represented by three-dimensional coordinates. The input position obtaining unit 104 may regularly or irregularly obtain an input position.

In this embodiment, when the non-indicating state in which the user's hand does not point to the screen is changed to the indicating state in which the user's hand points to the screen, the input position obtaining unit 104 obtains the current actual indicated position as an input position $P_3$ (FIG. 5). The non-indicating state is a state in which the user's hand is not directed to the screen and the actual indicated position is not on the screen. The indicating state is a state in which the user's hand is directed to the screen and the actual indicated position is on the screen.

For example, the input position obtaining unit 104 determines whether a state is the non-indicating state or the indicating state based on the current position of the user's hand. For example, an actual indicated position is obtainable when a state transitions to the indicating state. As such, the input position obtaining unit 104 may determine that a state is the non-indicating state when an actual indicated position is not obtainable, and a state is the indicating state when an actual indicated position is obtainable.

When the user moves his hand, the input position obtaining unit 104 can suppress the movement amount of the input position relative to the operation amount based on the relative position. As described above, in this embodiment, just after the non-indicating state is changed to the indicating state, the actual indicated position is set to an input position as it is, and thus the input position obtaining unit 104 can suppress the movement amount of the input position when the user moves his hand after the user's hand is in the indicating state.

The operation amount is a movement amount (positional displacement) or a rotation amount (angular displacement) of a hand, which is an example of an object. The movement amount of the input position is a distance between the input position before the hand moves and the input position after the hand moves, where the hand is an example of an object. To suppress indicates to reduce the movement amount of the input position to be smaller than the movement amount of the actual indicated position when the hand, which is an example of an object, is moved. In other words, to suppress is to set an input position to a position closer to the user than the actual indicated position viewed from the user.

In this embodiment, the input position obtaining unit 104 obtains, as a reference position, an actual indicated position ($P_3$ in FIG. 5) at the time when the user's hand is changed from the non-indicating state to the indicating state. Here, the input position when the non-indicating state is changed to the indicating state is the same as the actual indicated position, and thus the reference position is also the same as the input position at this point. As such, the reference position may also be described as an initial input position, and a start position from which an input position is to be moved. The reference position is stored in the data storage unit 100.

For example, when the user moves his hand after the user's hand transitions to the indicating state, the input position obtaining unit 104 can suppress the movement amount of the input position from the reference position based on the relative position. Specifically, the input position obtaining unit 104 obtains a unit movement amount $\Delta x$ corresponding to the current relative position $\theta$ based on the relational data. Subsequently, the input position obtaining unit 104 obtains an operation amount $\Delta\theta$ based on a change in position of the user's hand, and determines a movement amount x of the input position from the reference position based on the operation amount $\Delta\theta$ and the unit movement amount $\Delta x$.

As described above, the relational data defines the unit movement amount $\Delta x$ such that a movement amount x of the input position is smaller than a movement amount of the actual indicated position (i.e., such that the movement amount x is suppressed). As such, the input position obtaining unit 104 can suppress the movement amount x by calculating the input position as described above. For example, the input position obtaining unit 104 may suppress the movement amount x to a smaller extent when the relative position $\theta$ is smaller, and suppress the movement amount x to a larger extent when the relative position $\theta$ is larger. In other words, the input position obtaining unit 104 suppresses the movement amount x to a smaller extent when the user is more closer to the front of the actual indicated position, and suppresses the movement amount x to a larger extent when the actual indicated position is more further from the front of the actual indicated position. The moving direction of the input position may be determined based on the direction in which the position of the user's hand is changed or the direction in which the actual indicated position is changed.

As described above, in this embodiment, the input position is determined based on the operation amount $\Delta\theta$ of the user's hand moving to the head. As such, when the user has moved his hand, the input position obtaining unit 104 obtains an input position based on a change in the relative position of the hand to the user. The relative position of the hand to the user is positional relationship between the user and the hand, and indicates where the hand is positioned when viewed from the user. The relative position may be represented by information capable of identifying the position of the hand viewed from the user, such as a vector or a coordinate value. Here, as described above, an angle $\Delta\theta$ is used. In other words, when the user has moved his hand, the input position obtaining unit 104 obtains an input position based on an angle $\Delta\theta$ of the movement of the hand to the user. The input position obtaining unit 104 may obtain the relative position of the hand to any portion of the user, and here, as described above, obtains the relative position of the hand to the user's head.

When the user moves his hand after the user's hand transitions to the indicating state, the input position obtaining unit 104 obtains an input position such that a movement amount from the reference position to the current input position ($P_5$ in FIG. 5) is smaller than a movement amount from the reference position ($P_3$ in FIG. 5) to the current actual indicated position ($P_4$ in FIG. 5). The degree of reducing the movement amount may be freely determined.

Here, when the angle θ is larger, a difference between the movement amount of the actual indicated position and the movement amount of the input position is larger, and the degree of suppressing the movement amount of the input position is larger.

After the user's hand goes into the indicating state and then goes into the non-indicating state again, the input position obtaining unit 104 may stop the processing for obtaining the input position. After the user's hand goes into the non-indicating state again and then goes into the indicating state again, the input position obtaining unit 104 may reobtain the current actual indicated position as a new input position and a new reference position. The method for determining the indicating state and the non-indicating state is described above. When it is determined that the user's hand goes into the indicating state from the non-indicating state, the input position obtaining unit 104 does not perform processing for obtaining an input position, and subsequently, when it is determined that the user's hand goes into the indicating state again, the input position obtaining unit 104 resumes processing for obtaining an input position.

When the user puts his hand down and then raises his hand to indicate the screen, the hand gradually moves from below upward, and thus the hand points out around the lower part of the screen before the user reaches the position that the user wishes to point out. As such, in a strict sense, a position at which the indicating state starts is always at the edge of the screen. In view of this, when the user's hand goes into the indicating state from the non-indicating state and the position of the hand is maintained in the indicating state for a predetermined period of time or more, the input position obtaining unit 104 may obtain the current actual indicated position as an input position and a reference position.

"The position of the hand is maintained" means that the position of the hand stays the same or substantially stays the same. "The position of the hand substantially stays the same" means that a movement amount of the position of the hand is less than a threshold value, and the hand is kept within a prescribed range. The predetermined period of time may be any predetermined time (e.g., 1 second), and may be a fixed value or a variable value. The input position obtaining unit 104 determines whether the position of the hand is maintained based on change in the position of the hand, and when it is determined that the position is maintained, starts clocking to determine whether the predetermined period of time has passed. The input position obtaining unit 104 determines whether the position of the hand is maintained while clocking, and continues clocking when it is determined that the position of the hand is maintained, and stops clocking when it is determined that the position of the hand is not maintained. When it is determined that the predetermined period of time has passed, the input position obtaining unit 104 obtains the current actual indicated position as an input position and a reference position.

[3-6. Processing Execution Unit]

The processing execution unit 105 is implemented mainly by the control unit 11. The processing execution unit 105 executes predetermined processing based on the input position obtained by the input position obtaining unit 104. In this embodiment, the predetermined processing is image processing for enabling an input position to be recognizable on the screen. This image processing includes, for example, displaying an image at the input position or within a predetermined distance from the input position, changing color, brightness, or transparency of the input position or the area within the predetermined distance from the input position, or providing effects, such as flashing, to the input position or the area within the predetermined distance from the input position. In this embodiment, displaying the pointer 40 at the input position corresponds to the predetermined processing.

The predetermined processing may be any predetermined processing, and include processing other than the image processing described above. For example, the predetermined processing may be selecting processing for selecting an image displayed on the screen (e.g., input form or button), or motion control processing for moving a moving object (e.g., 3D model) in a virtual space or an image in the screen. For example, the predetermined processing may be input processing to a software keyboard, or drawing processing for drawing graphics with software. The positions on the screen may be respectively associated with a plurality of processing contents in advance, and the processing associated with the input position may be executed as the predetermined processing.

[3-7. Motion Determining Unit]

The motion determining unit 106 is implemented mainly by the control unit 11. The motion determining unit 106 determines whether a user has moved. Any portion of the user may be determined by the motion determining unit 106, and here, a head, which is the reference portion, is determined. In this embodiment, the motion determining unit 106 determines whether the user has moved based on changes in the portion information. For example, the motion determining unit 106 determines that the user has moved when the movement amount of the user's head is equal to or more than the threshold value, and that the user has not moved when the movement amount of the user's head is less than the threshold value. The movement amount of the head may use changes in the position of the head in a predetermined period of time (e.g., 1 second).

The relative position obtaining unit 103 reobtains a relative position when the motion determining unit 106 determines that the user has moved. The relative position obtaining unit 103 obtains the latest relative position based on the current portion information. The input position obtaining unit 104 reobtains an input position based on the reobtained relative position. The input position obtaining unit 104 reobtains an input position based on the latest relative position. The method for obtaining the relative position and the input position is described above.

[4. Processing Executed in this Embodiment]

Figure 8:
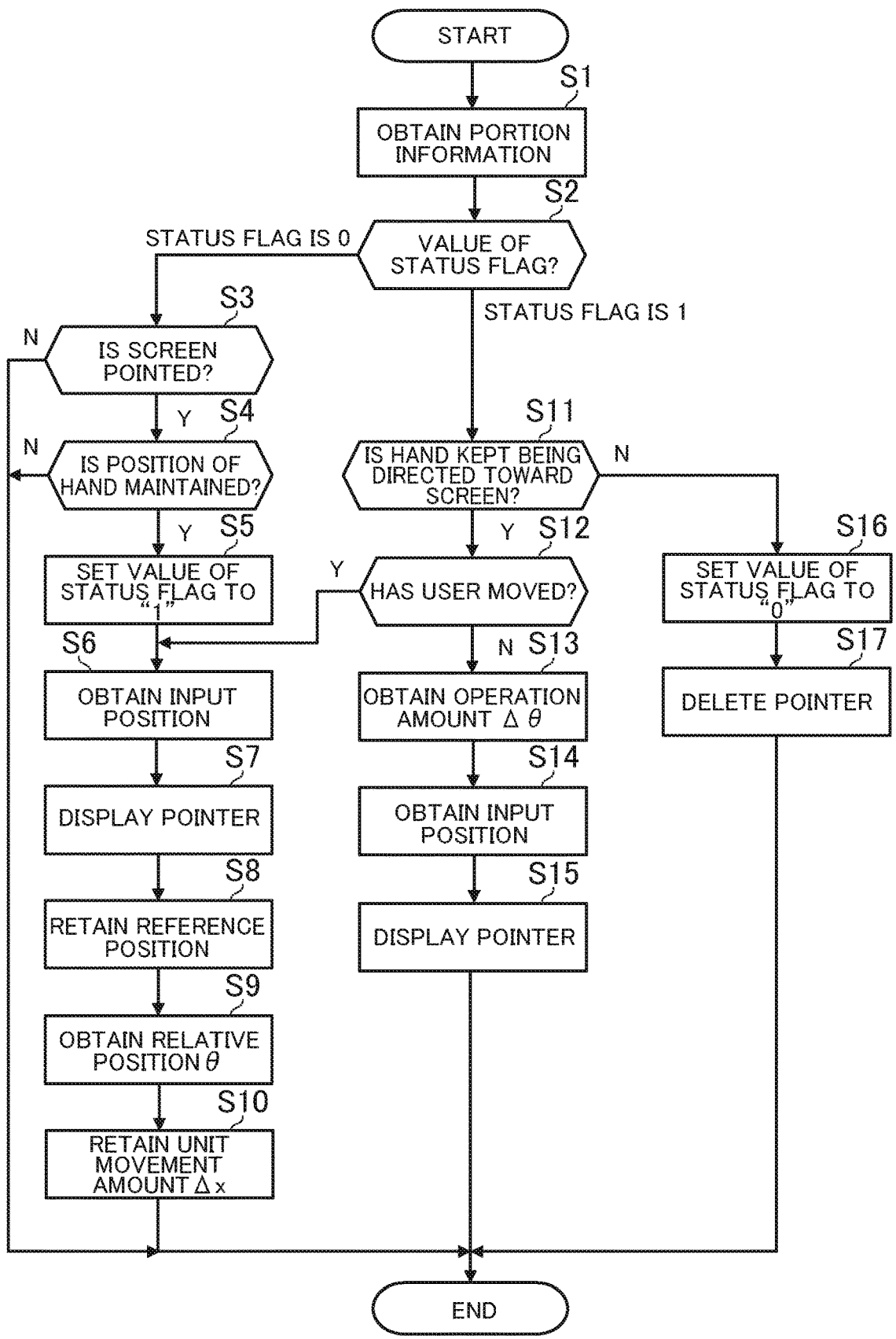
FIG. 8 is a flow chart showing an example of processing executed in the information processing device.

FIG. 8 is a flow chart showing an example of processing executed in the information processing device 10. The processing shown in FIG. 8 is an example of the processing executed by the functional block shown in FIG. 7, and executed when the control unit 11 operates in accordance with the program stored in the storage unit 12. The processing shown in FIG. 8 is executed at regular time intervals that are determined based on the frame rate of the position detecting device 20 (i.e., frame as a processing unit). The frames of the information processing device 10 and the frames of the position detecting device 20 are synchronized.

As shown in FIG. 8, the control unit 11 obtains the portion information generated by the position detecting device 20 through the communication unit 13 (S1). In S1, the control unit 11 records the obtained portion information into the storage unit 12, and stores the history of the portion information in the storage unit 12.

The control unit 11 refers to a value of a status flag for identifying if the user's hand points to the screen of the large display 30 (S2). The status flag is stored in the storage unit 12. For example, if the status flag is "0", the user's hand does not point to the screen, and if the status flag is "1", the user's hand points to the screen. The initial value of the status flag is "0." As such, in the first frame, the status flag is "0." In the second and subsequent frames, the value of the status flag indicates the status of the hand in the most recent frame. As such, in S2, the control unit 11 determines whether the user's hand points to the screen in the most recent frame.

If the status flag is "0" (S2: status flag is 0), the control unit 11 determines whether the screen of the large display 30 is pointed to based on the portion information obtained in S1 (S3). In S3, the control unit 11 refers to the three-dimensional coordinates of the user's head and hand indicated by the portion information, and determines whether a line extending from the head to the hand intersects the screen of the large display 30. As described above, the area on the $X_w$-$Y_w$ plane corresponding to the screen of the large display 30 is stored in the storage unit 12 in advance, and the control unit 11 determines whether the line from the head to the hand intersects the area.

If it is determined that the screen is pointed to (S3: Y), the control unit 11 determines that the position of the user's hand is maintained for a predetermined period of time or more (S4). In S4, the control unit 11 refers to the history of the portion information, and determines whether the movement amount of the user's hand continues to be within the threshold value for the predetermined period of time or more. If it is not determined that the screen is pointed to (S3: N) or that the position of the user's hand is maintained for a predetermined period of time or more (S4: N), this processing terminates, and the processing starts again from S1 when the next frame arrives.

If it is determined that the position of the user's hand is maintained for a predetermined period of time or more (S4: Y), the control unit 11 sets a value of the status flag to "1" (S5), calculates an actual indicated position based on the portion information obtained in S1, and obtain the calculated actual indicated position as an input position (S6). In S6, the control unit 11 calculates three-dimensional coordinates of the intersection point of the line from the head to the hand and the screen of the large display 30. In this embodiment, the actual indicated position is represented by three-dimensional coordinates, and thus the control unit 11 uses the three-dimensional coordinates of the intersection point as the actual indicated position. If the actual indicated position is represented by two-dimensional coordinates, however, the three-dimensional coordinates of the intersection point may be converted into two-dimensional coordinates in the screen coordinate system. The coordinate conversion between the world coordinate system and the screen coordinate system may use a predetermined determinant.

The control unit 11 displays the pointer 40 based on the input position obtained in S6 (S7). An image data of the pointer 40 is stored in the storage unit 12 in advance, and the control unit 11 displays the pointer 40 at the input position based on the image data.

The control unit 11 temporarily retains the actual indicated position calculated in S6 in the storage unit 12 as a reference position (S8). The retained reference position is referred to in the next and subsequent frames to determine an input position.

The control unit 11 obtains a relative position θ based on the portion information obtained in S1 (S9). In S9, the control unit 11 refers to the three-dimensional coordinates of the user's head, and obtains the three-dimensional coordinates of the foot of the perpendicular to the screen. The control unit 11 obtains, as a relative position, an angle θ generated by the three-dimensional coordinates of the foot of the perpendicular, the three-dimensional coordinates of the user's head, and the three-dimensional coordinates of the actual indicated position or the hand.

The control unit 11 refers to the relational data stored in the storage unit 12, obtains a unit movement amount Δx corresponding to the relative position θ obtained in S9, and temporarily retains the obtained unit movement amount Δx in the storage unit 12 (S10), and then the processing terminates. The retained unit movement amount Δx is referred to in the next and subsequent frames to determine an input position.

If the status flag is "1" in S2 (S2: status flag is 1), the user's hand is directed toward the screen and the pointer 40 is displayed in the most recent frame. In this case, the control unit 11 determines whether the user's hand is kept being directed toward the screen based on the portion information obtained in S1 (S11). The determining method in S11 is the same as S3.

If it is determined that the user's hand is kept being directed toward the screen (S11: Y), the control unit 11 determines whether the user has moved based on the portion information obtained in S1 (S12). In S12, the control unit 11 obtains a movement amount of the user's head in the three-dimensional coordinates based on the history of the portion information, and determines whether the movement amount is the threshold value or more. The control unit 11 determines that the user has moved when the movement amount is the threshold value or more, and determines that the user has not moved when the movement amount is less than the threshold value. The threshold value may be a predetermined fixed value or a variable value.

If it is determined that the user has moved (S12: Y), the processing proceeds to S6. In this case, the control unit 11 obtains the current actual indicated position as an input position in S6, and displays the pointer 40 at the input position in S7. The display position of the pointer (i.e., input position) is changed at this point. The control unit 11 retains the current actual indicated position again as a reference position in S8, calculates an angle θ in S9, and retains the unit movement amount Δx again in S10. These retained reference position and unit movement amount Δx are referred to in the next and subsequent frames.

If it is not determined that the user has moved (S12: N), the control unit 11 obtains an operation amount Δθ of the user based on the portion information obtained in S1 (S13). The control unit 11 obtains, as an operation amount Δθ, an angle generated by the three-dimensional coordinates of the reference position, the three-dimensional coordinates of the user's head, and the three-dimensional coordinates of the current actual indicated position or the hand.

The control unit 11 obtains an input position based on the reference position and the unit movement amount Δx retained in the storage unit 12 and the operation amount Δθ obtained in S13 (S14). In S14, the control unit 11 calculates a movement amount x by multiplying the operation amount Δθ and the unit movement amount Δx. As described above, this movement amount x is a suppressed movement amount smaller than the movement amount of the actual indicated position. The control unit 11 then obtains a moving direction based on the current actual indicated position or the three-dimensional coordinates of the hand. The control unit 11 obtains a position away from the reference position by the movement amount x in the moving direction as an input position.

The control unit 11 displays the pointer 40 at the input position obtained in S14 (S15), and the processing terminates. The processing in S15 is the same as the processing in S6 except that the control unit 11 moves the pointer 40 because the pointer 40 is displayed already. In S11, if it is determined that the user's hand is not kept being directed toward the screen (S11: N), the indicating state is changed to the non-indicating state. In this case, the control unit 11 sets a value of the status flag to "0" (S16), and deletes the pointer 40 (S17). The processing then terminates, and the processing starts again from S1 when the next frame arrives.

According to the above-described information processing system 1, the movement amount of the input position when the user has moved his hand is suppressed based on the relative position θ. This enables fine adjustment of the input position even if the angle indicated by the relative position θ is large. As such, it is possible to improve operability of a user interface in which a user directs his hand toward a screen, thereby entering an input position on the screen. That is, while keeping the intuitive operation where an input position is moved in a direction in which a position indicated by a user is moved, the operability can be improved by avoiding a rapid movement of the input position when the relative position θ is high.

Further, just after a user points to the screen, the user may often wish to designate, as an input position, a position that the user actually points to. As such, when the non-indicating state is changed to the indicating state, the user may feel uncomfortable if a position that is not the actual indicated position is set to an input position. In this regard, just after the non-indicating state is changed to the indicating state, the actual indicated position is set to an input position as it is in the information processing system 1. As such, a position that the user wants to designate can be set as an input position, which prevents the user from feeling uncomfortable.

If the user's hand transitions to the indicating state and then moves, the movement amount of the input position viewed from the reference position is suppressed based on the relative position θ. As such, the user can understand that how far the input position moves from the reference position depends on how far the user moves his hand from the position of the hand at the time when the state transitions to the indicating state. For example, when a unit movement amount Δx from the reference position is determined based on the relative position θ, after the state transitions to the indicating state, the movement amount of the input position can be proportional to the operation amount. This enables more intuitive operation.

The information processing device 10 obtains the portion information including the three-dimensional coordinates indicating the position of the user's hand and the three-dimensional coordinates indicating the reference portion of the user, and thus the position of the user's hand can be obtained more accurately. As a result, the motion of the user's hand can be more accurately reflected to the actual indicated position, the relative position, and the input position.

The actual indicated position and the relative position are determined on the basis of the user' head, which has the user's eyes, and thus more intuitive operation can be provided.

The input position is obtained based on changes in the relative position of the hand to the user, and how far the user's hand has moved toward the user can be reflected to the motion of the input position. This enables more intuitive operation.

The input position is obtained based on an angle of the motion of the hand to the user. The angle of the motion of the hand can be instinctively recognized by the user in terms of its operation amount, and thus more intuitive operation can be provided.

If the user moves by himself, the relative position of the user to the actual indicated position changes. In such a case, the relative position is reobtained, and the input position is also reobtained based on the reobtained relative position, which serves to provide an operation corresponding to the current position of the user. For example, if the relative position is not updated and the unit movement amount Δx is not changed after the user has moved, the user may feel uncomfortable because the unit movement amount Δx does not change even if the user has moved to the position near the front of the actual indicated position where the fine adjustment of the input position is possible. Such uncomfortable feeling can be avoided if the relative position is reobtained.

The input position is obtained such that the movement amount from the reference position to the current input position is smaller than the movement amount from the reference position to the actual indicated position, and thus the movement amount when the input position is moved from the reference position can be suppressed.

After the user's hand goes into the indicating state and then goes into the non-indicating state again, the user's hand does not indicate the screen. As such, unnecessary processing can be avoided by stopping processing for obtaining the input position, and the processing load on the information processing device 10 can be thereby reduced. After that, when the state transitions to the indicating state again, new input position and reference position are obtained, and the pointer 40 can be thereby displayed again.

When the state transitions to the indicating state and the position of the user's hand is maintained for a predetermined period of time or more, the current actual indicated position is obtained as an input position and a reference position. This prevents the input position and the reference position from being obtained before the hand is moved to a position at which the user points to a desired position, and an input position and a reference position are obtained after the user has moved to the user's desired position. This enables to provide the user with an input position that the user intends and an operation that the user desires.

The image processing for making an input position identifiable is set as predetermined processing, which enables the user to identify the input position. This improves the operability of the information processing device 10 enabling an input position to be identifiable.

Further, an object is set to the user's hand, which provides the user with more intuitive operation, and also eliminates the need of preparing an input device.

[5. Variations]

The present invention is not to be limited to the above described embodiment and can be changed as appropriate without departing from the spirit of the invention.

Figure 9:
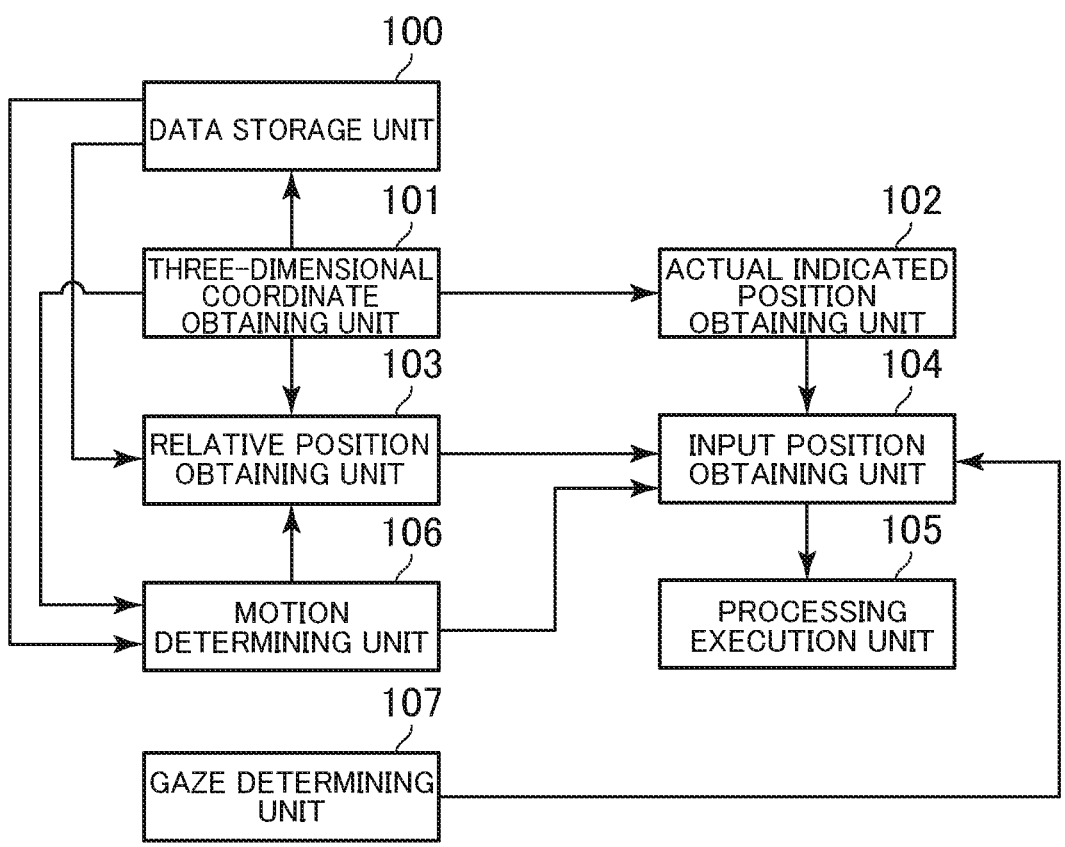
FIG. 9 is a functional block diagram of a variation.

FIG. 9 is a functional block diagram of a variation. As shown in FIG. 9, in the variation, a gaze determining unit 107 is implemented in addition to the functions described in the embodiment. The gaze determining unit 107 is implemented mainly by the control unit 11.

(1) For example, in the embodiment, when the user moves, the processing for setting the current actual indicated position as new input position and reference position (hereinafter, reset processing) is performed, although the reset processing may be performed in a condition other than the motion of the user. This condition may be any predetermined condition, such as, a condition that a predetermined period of time has passed, or a condition that the user performs a predetermined operation. In this case, the reset processing may be performed in response to the condition satisfied in the indicating state, and the position of the pointer 40 may be updated. Further, when the user fixes his eyes on around the pointer 40, the user and the audience pay attention to around the pointer 40, and thus the reset processing may not be performed so as not to move the pointer 40 by the reset processing.

When the predetermined condition is satisfied after the user's hand transitions to the indicating state, the input position obtaining unit 104 in this variation reobtains the current actual indicated position as a new input position and a reference position. For example, if the predetermined condition is the motion of the user as described in the embodiment, the input position obtaining unit 104 performs the processing for reobtaining an input position and a reference position based on the determination result of the motion determining unit 106 as described in the embodiment.

For example, if the predetermined condition is whether a predetermined period of time has passed, the input position obtaining unit 104 may determine, using a real-time clock, for example, whether the predetermined period of time has passed since the most-recent time when the reference position is obtained. The predetermined period of time may be indicated by the number of seconds or frames. Further, the predetermined period of time may be a fixed value or a variable value. For example, if the predetermined condition corresponds to the user's predetermined operation, the input position obtaining unit 104 may determine whether the user performs the predetermined operation based on the operation unit 14 or the portion information. When the portion information is used, performing the predetermined operation may correspond to the user's predetermined gesture. In this case, a known method for determining a gesture may be used.

The information processing device of this variation includes the gaze determining unit 107. The gaze determining unit 107 determines whether the user is gazing at an input position. This determination may use a known gaze detection method, or a gaze direction estimated from the portion information. When a known gaze detection method is used, for example, a gaze direction may be detected by capturing the user's eyes by a camera. When a gaze direction is estimated from the portion information, the gaze determining unit 107 may obtain an orientation of the head from positional relationship of the bone structure indicated by the portion information, and determine the orientation of the head as the gaze direction.

The gaze determining unit 107 performs determination processing based on the user's gaze direction. For example, the gaze determining unit 107 obtains a gaze point on the screen based on the portion information and the user's gaze direction. The gaze point may be an intersection point of a line from the position of the user's head in the gaze direction and the screen. For example, the gaze determining unit 107 determines whether a distance between the gaze point and the input position is less than a threshold value. The gaze determining unit 107 determines that the user is gazing at the input position if the distance is less than the threshold value, and determines that the user is not gazing at the input position if the distance is equal to or more than the threshold value.

If it is determined that the user is gazing at the input position, the input position obtaining unit 104 does not perform the reset processing for setting the current actual indicated position to an input position and a reference position, even if the predetermined condition is satisfied. In this case, the input position obtaining unit 104 uses the current reference position as it is to obtain an input position based on the current position of the user's hand as in the method described in the embodiment. As such, unless the user moves his hand, the pointer 40 is fixed to the current position.

On the other hand, if it is determined that the user is not gazing at the input position and the predetermined condition is satisfied, the input position obtaining unit 104 performs the reset processing for setting the current actual indicated position to an input position and a reference position. In this case, the input position and the reference position are reset, and the position of the pointer 40 is changed.

According to the variation (1), when the user is gazing at the input position, the reset processing is not performed. As such, it is possible to prevent the input position from being arbitrarily changed although the user is gazing at the input position without moving the hand.

(2) For example, when the user moves his hand, the input position obtaining unit 104 may obtain an input position based on a velocity of the hand. For example, the input position obtaining unit 104 determines a movement amount of the input position based on the velocity of the user's hand. The relationship between the velocity of the hand and the movement amount of the input position may be stored in the data storage unit in advance. This relationship may be defined such that the movement amount of the input position increases as the velocity of the hand is higher, and the movement amount of the input position reduces as the velocity of the hand is lower. Here, the input position obtaining unit 104 changes the unit movement amount $\Delta x$ based on the velocity of the user's hand.

Figure 10:
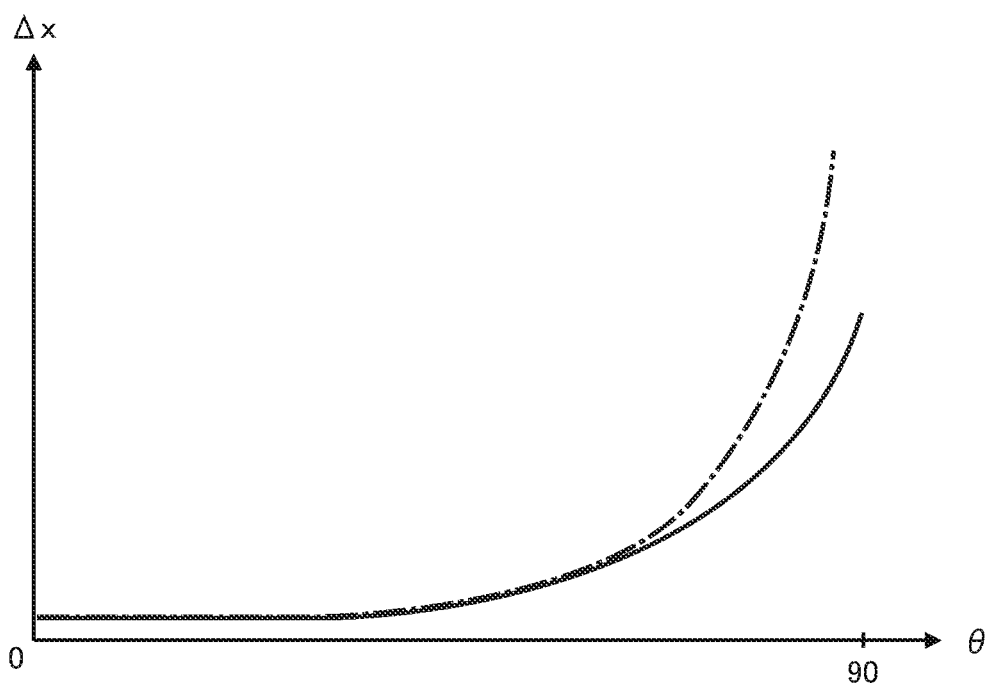
FIG. 10 is a diagram illustrating an example of storing relational data in variation (2)

FIG. 10 is a diagram illustrating an example of storing relational data in variation (2). As shown in FIG. 10, relational data referred to by the input position obtaining unit 104 may be changed depending on the velocity of the user's hand. In FIG. 10, relational data when the velocity of the user's hand is slow is indicated by a solid line, and relational data when the velocity of the user's hand is fast is indicated by a dot-and-dash line. For example, when the user quickly moves the hand in the indicating state, the input position obtaining unit 104 may increase a unit movement amount $\Delta x$ assuming that fine adjustment of the input position is not needed so much. On the other hand, when the user slowly moves the hand in the indicating state, the input position obtaining unit 104 may reduce a unit movement amount $\Delta x$ assuming that fine adjustment of the input position is needed. The method for obtaining an input position based on a unit movement amount $\Delta x$ is the same as described in the embodiment.

According to the variation (2), an input position is obtained based on the velocity when the user moves his hand, and thus more intuitive operation can be provided and the operability can be improved.

(3) For example, in the embodiment, obtaining an input position is started when the position of the user's hand is maintained in the indicating state for a predetermined period of time or more, although obtaining an input position may be started under the other conditions. For example, a gesture as a signal for starting obtaining an input position (in other words, a signal for displaying the pointer 40) may be determined in advance, and obtaining an input position may be started when the user makes the gesture.

The input position obtaining unit 104 in this variation obtains the current actual indicated position as an input position and a reference position when the user's hand transitions to the indicating state and the predetermined condition. The predetermined condition may be any condition that is feasible by the user's intention, such as a condition that the user makes a predetermined gesture by a hand. Here, a hand corresponds to an object, and a predetermined gesture may be closing or opening the hand, or raising a predetermined finger. The input position obtaining unit 104 refrains from obtaining an input position and a reference position until the user's hand transitions to the predetermined condition even after the user's hand transitions to the indicating state.

For example, the input position obtaining unit 104 determines whether the user's hand is in the predetermined condition based on the portion information. In this case, the input position obtaining unit determines whether the position of the hand indicated by the portion information makes a predetermined change. For example, the input position obtaining unit 104 determines whether the user's hand is in the predetermined condition based on an image captured by the position detecting device 20. In this case, template images indicating the predetermined condition may be prepared in advance, and the input position obtaining unit 104 may determine whether the user's hand is in the predetermined condition by template matching, or by time-series changes in images.

When the user moves his hand while the user's hand maintains the predetermined condition, the input position obtaining unit 104 obtains an input position based on the reference position. That is, the input position obtaining unit may continue to determine whether the user's hand is in the predetermined condition after an input position and a reference position are obtained. The method for obtaining the input position is the same as described above. The input position obtaining unit may terminate the processing for obtaining an input position after the predetermined condition of the user's hand is released.

According to the variation (3), when the user's hand transitions to the predetermined condition after the user's hand transitions to the indicating state, the current actual indicated position is obtained as an input position and a reference position, and thus the user can make a signal for starting obtaining an input position. As a result, it is possible to increase the probability that a position intended by the user can be set as an input position.

(4) For example, in the embodiment, the actual indicated position when the user's hand transitions to the indicating state is set as a reference position, and an input position is obtained such that a movement amount is suppressed based on a relative movement amount x from the reference position. However, the method for obtaining an input position is not limited to this method. An input position may not be relatively obtained based on the actual indicated position in the past, but may be absolutely obtained based on the current actual indicated position.

FIG. 11 is a diagram illustrating a method for obtaining an input position in variation (4). As shown in FIG. 11, the input position obtaining unit 104 may suppress a movement amount of the input position by moving the current actual indicated position toward the user. For example, assuming that an actual indicated position is $P_{10}$ when the position of the user's hand is $F_{p10}$, an input position may be set to a position $P_{11}$, which is obtained by moving the actual indicated position P10 by a distance $y_{10}$ corresponding to the current relative position $\theta_{10}$. Subsequently, assuming that the position of the user's hand when the user moves his hand to the right is $F_{p11}$ and the actual indicated position in this case is $P_{12}$, an input position may be set to a position $P_{13}$, which is obtained by moving the actual indicated position $P_{12}$ by a distance $y_{11}$ corresponding to the current relative position $\theta_{11}$. The distance $y_{11}$ may be longer than the distance $y_{10}$. The data indicating relationship between the relative position $\theta$ and the distance y may be stored in the data storage unit 100 in advance. The actual indicated position obtaining unit 102 moves the actual indicated position toward the user by a distance y associated with the current relative position $\theta$. In this case as well, a movement amount of an input position relative to an operation amount can be suppressed.

(5) For example, the case has been described in which the position detecting device 20 is disposed on the upper surface of the large display 30, although the position detecting device 20 may be disposed on any position other than the upper surface if a hand, which is an example of an object, is detectable. For example, the position detecting device 20 may be disposed on the left, right, upper, or lower part of the large display. Alternatively, the position detecting device 20 may be worn by the user. For example, the position detecting device 20 may be attached to glasses. In other words, the position detecting device 20 may be wearable.

When the position detecting device 20 is wearable, the information processing device 10 may estimate a position of the user to the screen based on a size and a degree of distortion of the screen detected by the position detecting device 20. For example, the data indicating relationship between the position of the user to the screen and the size and the degree of distortion of the screen viewed from the position of the user is stored in the data storage unit 100 in advance. Such data may be in numerical formula, or other formula than numerical formula. The information processing device 10 may estimate, as the current position of the user, a position of data having the highest matching degree when comparing the screen detected by the position detecting device 20 with the data. If the position of the user to the screen can be estimated, the information processing device 10 can obtain a position of the user's hand viewed from the position detecting device 20. As such, positional relationship of the screen, the user, and the hand in the space can be specified. The subsequent processing may be the same as the processing in the embodiment and the variations described above.

For example, in the embodiment, when the user's hand transitions to the indicating state from the non-indicating state, the current actual indicated position is set to an input position, although an input position just after the hand transitions to the indicating state may not need to be the actual indicated position. In this case, an input position may be a position shifted from the actual indicated position by a predetermined distance, or any position in an area including the actual indicated position. For example, the case has been described in which positions such as the actual indicated position are specified based on the portion information indicating the three-dimensional coordinates of respective portions of the user, although the three-dimensional coordinates may not necessarily be used if information capable of identifying the positions of the user, such as a hand, is used. For example, positions of the respective portions of the user may be indicated in two-dimensional coordinates, or by vector information viewed from the position detecting device 20.

For example, in the embodiment, a position of the user as a reference of a relative position is the user's head, although such position may be other portion. For example, the relative position obtaining unit 103 may obtain a relative position based on any portion of the user's torso, such as neck, chest, backbone, or waist. For example, apart from the torso, the relative position obtaining unit 103 may also obtain a relative position based on a portion other than a hand, such as elbow and shoulder. For example, in the embodiment, an input position is obtained based on changes in the relative position of the hand to the user, although the relative position may not need to be used if the object is not a hand and a direction that the user wants to designate can be specified without using the relative position. For example, if a controller including a gyro sensor or an accelerometer corresponds to an object, orientation (posture) of the object can be detected. In this case, the relative position needs not to be used. As such, the angle described in the embodiment as an example of the relative position also needs not to be used.

For example, in the embodiment, a relative position is reobtained when the user has moved, although this processing may be omitted and, even though the user has moved, the relative position at the time when a state transitions to the indicating state may be used as it is to obtain an input position. For example, in the embodiment, an input position is determined so that a movement amount of the input position from the reference position is smaller than a movement amount of an actual indicated position from the reference position, although an input position may be determined without considering a movement amount from the reference position if a reference position is not particularly set. In this case, the movement amount of the input position may be suppressed by setting a position closer to the user than the actual indicated position to the input position.

For example, the case has been described in which the processing for obtaining an input position terminates when the user's hand transitions to the non-indicating state, although this processing may continue to be executed even though the user's hand transitions to the non-indicating state. However, in the non-indicating state, a position obtained as an input position is placed outside the screen, and thus the pointer 40 is not displayed on the screen. For example, the case has been described in which an actual indicated position is set to an input position and a reference position when the position of the user's hand is maintained for a predetermined period of time or more, although whether the position of the hand is maintained may not be determined. In this case, as described in the variation (3), an actual indicated position at the time when the user's hand transitions to the predetermined condition may be set to an input position and a reference position, or an actual indicated position at the time when other operation is performed may be set to an input position and a reference position. For example, in the embodiment, the reference portion for obtaining the actual indicated position is a head, although the reference portion may be other portion. For example, a reference portion may be any portion of the user's torso, such as neck, chest, backbone, or waist, or, apart from the torso, any portion other than a hand, such as elbow and shoulder.

For example, the user's hand has been taken as an example of an object, although the object may be a portion other than a hand, or an operating member other than the portions of the user. In the embodiment and the variations, the description of "hand" can be replaced with "object." For example, if the object is the user's finger, an input position may be entered by a change in a direction of the user's finger. Even if the position of the object is not changed, an indicated position may be changed by rotating the object at the position. For example, the large display 30 has been taken as an example of the screen, although the screen may be any surface on which an image is displayed, such as a flat surface (e.g., screen or wall) on which light of projector is projected.

For example, the position detecting device 20 may not include a depth sensor, and may estimate a depth from a size of a subject in an image captured by a camera. In this case, a standard size of a user may be registered in advance, and the position detecting device 20 may estimate a depth by comparing the standard size with a size of the user captured in the image. Further, if the position detecting device 20 is wearable, a standard size of a screen may be registered in advance, and the position detecting device 20 may estimate a depth by comparing a standard-sized screen with a size and a degree of distortion of the captured screen.

For example, the information processing device 10 may be integrated with the position detecting device 20. Similarly, the information processing device 10 may be integrated with the large display 30. When the position detecting device 20 includes a processor and a memory, the processing described as being executed by the information processing device 10 may be executed by the position detecting device 20. In this case, the position detecting device 20 corresponds to the information processing device according to the present invention. Similarly, when the large display 30 includes a processor and a memory, the processing described as being executed by the information processing device 10 may be executed by the large display 30. In this case, the large display 30 corresponds to the information processing device according to the present invention. Further, the information processing device 10 may be implemented by the server computer.

The invention claimed is:

1. An information processing device comprising at least one processor configured to:
   obtain a user-indicated position on a screen;
      wherein the user-indicated position is indicated by an object which is directed toward the screen by a user;
   obtain the user's position;
   obtain a position which is located on the screen which is at a point where a line from the user to the position is perpendicular to the screen;
   obtain an angle generated by the position, the user's position and the user-indicated position wherein the user's position is the vertex of the angle;
   obtain an input position on the screen corresponding to a current position of the object directed toward the screen by the user, and reducing a movement amount of the input position with respect to an operation amount based on the obtained angle when the user has moved the object,
   said reducing a movement amount being continuous so that the input position can be located at any point on the screen;
   execute predetermined processing based on the input position; and wherein the at least one processor reduces the movement amount when a position of the user, relative to the screen, does not change and the angle is changed.

2. The information processing device according to claim 1, wherein the at least one processor:

obtains the current position of the object as the input position when the object transitions to an indicating state, in which the object points to the screen, from a non-indicating state, in which the object does not point to the screen, and reduces a movement amount of the input position when the user moves the object after the object transitions to the indicating state.

3. The information processing device according to claim 2, wherein the at least one processor:

obtains, as a reference position, the user-indicated position when the object transitions to the indicating state from the non-indicating state, and reduces a movement amount of the input position from the reference position based on the angle when the user moves the object after the object transitions to the indicating state.

4. The information processing device according to claim 3, wherein the at least one processor obtains the input position such that a movement amount of the input position from the reference position is smaller than a movement amount of the current position of the object from the reference position when the user moves the object after the object transitions to the indicating state.

5. The information processing device according to claim 3, wherein the at least one processor:

terminates processing for obtaining the input position when the object transitions to the indicating state and then transitions to the non-indicating state again, and reobtains the current position of the object as a new input position and a new reference position when the object transitions to the non-indicating state again and then transitions to the indicating state again.

6. The information processing device according to claim 3, wherein the at least one processor reobtains the current position of the object as the input position and the reference position when the object transitions to the indicating state from the non-indicating state and a position of the object is maintained in the indicating state for a predetermined period of time or more.

7. The information processing device according to claim 3, wherein the at least one processor:

reobtains the current position of the object as a new input position and a new reference position when the object transitions to the indicating state and then a predetermined condition is satisfied, determines whether the user gazes at the input position, does not execute the processing for setting the current position of the object to an input position and a reference position if it is determined that the user gazes at the input position, even though the predetermined condition is satisfied, and executes the processing for setting the current position of the object to an input position and a reference position if it is determined that the user does not gaze at the input position and the predetermined condition is satisfied.

8. The information processing device according to claim 3, wherein the at least one processor:

obtains the current position of the object as the input position and the reference position when the object transitions to the indicating state and the predetermined condition, obtains the input position based on the reference position when the user moves the object while the object is maintained in the predetermined condition, and terminates the processing for obtaining the input position when the predetermined condition of the object is released.

9. The information processing device according to claim 1, wherein the at least one processor:

obtains three-dimensional coordinates indicating a position of the object and three-dimensional coordinates indicating the user's position, obtains the user-indicated position based on the three-dimensional coordinates of the object, obtains the angle based on the three-dimensional coordinates of the user's position, and obtains the input position based on the three-dimensional coordinates of the object.

10. The information processing device according to claim 1, wherein the user-indicated position is a position on the screen and is determined by a direction from a position of a head of the user to the position of the object, and the angle is of the head of the user with respect to the user-indicated position.

11. The information processing device according to claim 1, wherein the at least one processor obtains the input position based on a change in a relative position of the object to the user when the user moves the object.

12. The information processing device according to claim 1, wherein the at least one processor obtains the input position based on an angle of a motion of the object to the user when the user moves the object.

13. The information processing device according to claim 1, wherein the at least one processor:

determines whether the user has moved, if it is determined that the user has moved, reobtains the angle, and reobtains the input position based on the reobtained angle.

14. The information processing device according to claim 1, wherein the predetermined processing is image processing for making the input position identifiable on the screen.

15. The information processing device according to claim 1, wherein the at least one processor obtains the input position based on a velocity of the object when the user moves the object.

16. The information processing device according to claim 1, wherein the object is a hand of the user, the user-indicated position is a position on the screen and determined based on a direction from a position of a reference portion of the user to a position of the hand, and the relative position is a position of the reference portion with respect to the user-indicated position.

17. The information processing device according to claim 1, the at least one processor obtains information as the angle, the information relating an angle of a direction indicated by the object to the screen.

18. The information processing device according to claim 1, wherein the at least one processor reduces the movement amount to a smaller extent when the angle is smaller, and reducing the movement amount to a larger extent when the angle is larger.

19. An information processing method comprising:
- obtaining a user-indicated position on a screen;
  - wherein the user-indicated position is indicated by an object which is directed toward the screen by a user;
- obtaining the user's position;
- obtaining a position which is located on the screen which is at a point where a line from the user to the position is perpendicular to the screen;
- obtaining an angle generated by the position, the user's position and the user-indicated position wherein the user's position is the vertex of the angle;
- obtaining an input position on the screen corresponding to a current position of the object directed toward the screen by the user, and reducing of a movement amount of the input position with respect to an operation amount based on the obtained angle when the user has moved the object;
- said reducing a movement amount being continuous so that the input position can be located at any point on the screen; and
  - executing predetermined processing based on the input position; and
- reducing the movement amount when a position of the user, relative to the screen, does not change and the angle is changed.

20. A non-transitory computer-readable information storage medium for storing a program that causes a computer to:
- obtain a user-indicated position on a screen;
  - wherein the user-indicated position is indicated by an object which is directed toward the screen by a user;
- obtain the user's position;
- obtain a position which is located on the screen which is at a point where a line from the user to the position is perpendicular to the screen;
- obtain an angle generated by the position, the user's position and the user-indicated position wherein the user's position is the vertex of the angle;
- obtain an input position on the screen corresponding to a current position of the object directed toward the screen by the user, and reducing of a movement amount of the input position with respect to an operation amount based on the obtained angle when the user has moved the object;
- reduce the movement amount when a position of the user, relative to the screen, does not change and the angle is changed;
- said reducing a movement amount being continuous so that the input position can be located at any point on the screen; and
  - execute predetermined processing based on the input position.

* * * * *